(12) United States Patent
Ota et al.

(10) Patent No.: US 7,106,023 B2
(45) Date of Patent: Sep. 12, 2006

(54) MOTOR DRIVING APPARATUS

(75) Inventors: Naoto Ota, Funabashi (JP); Shinichi Kono, Yamanashi (JP); Mamoru Yaeshima, Hadano (JP); Yuuichi Yamada, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 0 days.

(21) Appl. No.: 11/234,144

(22) Filed: Sep. 26, 2005

(65) Prior Publication Data

US 2006/0066283 A1    Mar. 30, 2006

(30) Foreign Application Priority Data

Sep. 28, 2004   (JP)   ............... 2004-282546

(51) Int. Cl.
*H02P 27/04*   (2006.01)
*H02P 3/18*   (2006.01)

(52) U.S. Cl. .................. 318/803; 318/800; 318/801; 318/802; 318/376

(58) Field of Classification Search ............... 318/803, 318/801, 802, 800, 376
See application file for complete search history.

(56) References Cited

U.S. PATENT DOCUMENTS

| | | | |
|---|---|---|---|
| 4,695,776 A * | 9/1987 | Dishner et al. ............... 318/14 |
| 4,959,602 A * | 9/1990 | Scott et al. .................. 318/803 |
| 5,764,496 A * | 6/1998 | Sato et al. ..................... 363/37 |
| 6,118,678 A * | 9/2000 | Limpaecher et al. .......... 363/60 |
| 6,244,061 B1 * | 6/2001 | Takagi et al. .................. 62/229 |
| 6,333,611 B1 * | 12/2001 | Shibuya et al. ............. 318/370 |
| 6,367,273 B1 * | 4/2002 | Takagi et al. .................. 62/230 |
| 6,474,447 B1 * | 11/2002 | Tajima et al. ................ 187/290 |
| 6,737,762 B1 * | 5/2004 | Koenig ......................... 307/48 |
| 6,919,711 B1 * | 7/2005 | Haydock et al. ............... 322/24 |

FOREIGN PATENT DOCUMENTS

JP       2000-141440       5/2000

* cited by examiner

*Primary Examiner*—Rita Leykin
(74) *Attorney, Agent, or Firm*—Staas & Halsey LLP

(57) ABSTRACT

The present invention is directed to the provision of a servomotor driving apparatus that feeds energy stored in a power storage part connected with a DC link that connects a rectifier circuit with an inverter circuit so that the energy stored in the power storage part can be reduced. A motor driving apparatus (1) includes: a step-up type DC/DC converter circuit (11) for boosting voltage appearing at an output of the power storage part (C1) connected with a DC link; and a DC/AC conversion circuit (12, 14) for converting the boosted DC electric power into AC electric power and feeding it to an electric power source.

4 Claims, 5 Drawing Sheets

MOTOR DRIVING APPARATUS

BACKGROUND OF THE INVENTION

1. Field of the Invention

The present invention relates to a motor driving apparatus and, more particularly, it relates to a motor driving apparatus that feeds electric power, stored during regeneration, to an electric power source.

2. Description of the Related Art

In a motor driving apparatus, a large driving current flows during normal power operation and a regenerative current flows during deceleration. Therefore, the motor driving apparatus has to be designed in consideration of the peak current during normal power operation and, as a result, it is forced to be large in size and expensive. Further, the regenerative current generated during deceleration is fed to a resistor so that it is transformed into thermal energy and consumed and, therefore, the energy is wastefully lost.

As a measure to solve these problems, a motor driving apparatus disclosed in Japanese Unexamined Patent Publication No. 2000-141440 includes a power source rectifier circuit for converting AC electric power into DC electric power, an inverter circuit for converting DC electric power into AC electric power to drive an AC motor, and a DC link for connecting the power source rectifier circuit with the inverter circuit, wherein a capacitor is connected with the DC link.

Here, the electric power stored in the capacitor is supplied to the inverter circuit during acceleration of the motor, while the regenerative current is stored in this capacitor during deceleration of the motor, so that the driving current can be leveled and the regenerative current is not be consumed wastefully.

SUMMARY OF THE INVENTION

However, in order to implement the conventional motor driving apparatus set forth in Japanese Unexamined Patent Publication No. 2000-141440, a power storage means having a large capacitance (a capacitor or an electric double-layer capacitor) is needed. For example, when the motor driving apparatus is used for driving a motor in a very large servo-press machine that operates every second and that has an output of 200 KW, a capacitor of a capacitance as large as 1 F is needed.

Therefore, in order to perform maintenance work of the motor driving apparatus having the power storage means of such large capacitance, there is a problem in that an operator is forced to perform the maintenance work in an environment where hazardous voltage exists (in an environment where an enormous amount of energy exists) and the safety of the operator is impaired significantly.

Further, in the conventional motor driving apparatus that discharges the energy remaining in the large-capacitance storage means through the resistor and the like to avoid the hazardous voltage or the large amount of energy, there is another problem in that a large amount of electric power energy is consumed wastefully as heat energy.

In view of the above problems, it is an object of the present invention to provide a motor driving apparatus that can improve efficiency by using the energy stored in a power storage means connected with a DC link part.

It is a further object of the present invention to provide a servomotor driving apparatus that feeds the energy stored in the power storage means connected with the DC link part to an electric power source so that the energy stored in the power storage means can be reduced, for example, to the extent that a risk in maintenance work can be avoided.

In order to achieve the above objects, in the present invention, the voltage appearing at an output of the power storage part connected with the DC link is boosted and fed to the electric power source.

Thus, a motor driving apparatus according to the present invention includes: an inverter circuit for driving a motor; a power source rectifier circuit for rectifying AC electric power to DC electric power; a DC link for connecting the inverter circuit with the power source rectifier circuit; and a power storage part for storing electrostatic energy by means of DC link voltage generated in the DC link, wherein the voltage appearing at an output of the power storage part due to the stored electrostatic energy is boosted and the electric power having the boosted voltage is converted into AC electric power and fed to the AC electric power source.

The motor driving apparatus according to the present invention may include a step-up type DC/DC converter circuit for boosting the voltage appearing at the output of the power storage part due to the electrostatic energy stored in the power storage part and it may further include a DC/AC conversion circuit for converting the DC electric power boosted by the step-up type DC/DC converter circuit into AC electric power.

Further, when the power source rectifier circuit described above is configured so that it can perform regeneration, the motor driving apparatus according to the present invention may include a switch for disconnecting the power storage part from the DC link when the step-up type DC/DC converter circuit boosts the voltage appearing at the output of the power storage part and the power source rectifier circuit may convert the DC electric power boosted by the step-up type DC/DC converter circuit into AC electric power and feed it to the AC electric power source.

BRIEF DESCRIPTION OF THE DRAWINGS

These and other objects and features of the present invention will become more fully apparent from the description of the preferred embodiments as set forth below with reference to the accompanying drawings wherein.

DETAILED DESCRIPTION

Figure 1:
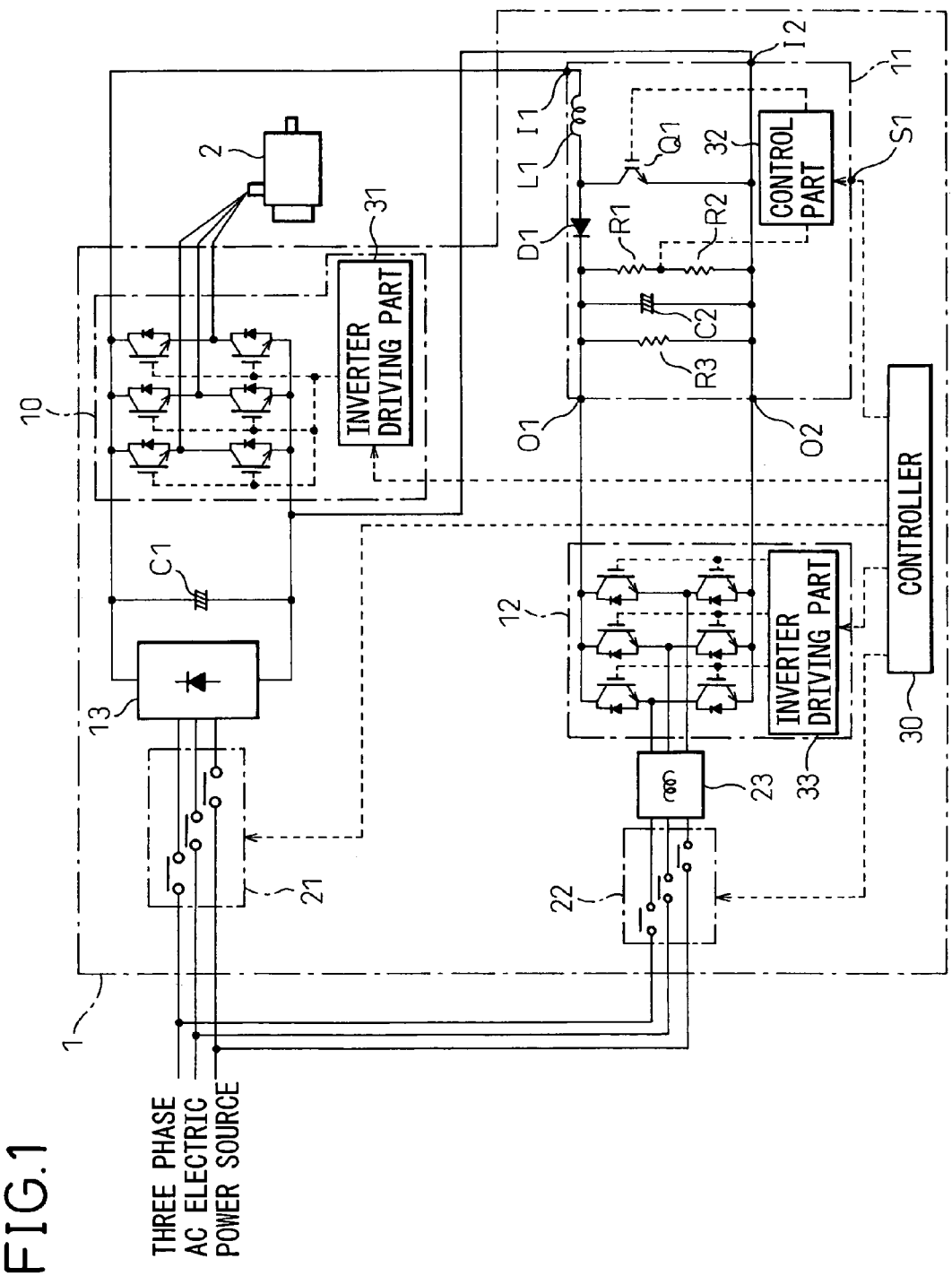
FIG. 1 is a block diagram of a motor driving apparatus according to a first embodiment of the present invention.

Hereinafter, preferred embodiments of the present invention will be described in detail with reference to the accompanying drawings. FIG. 1 is a block diagram of a motor driving apparatus of a first embodiment of the present invention. In the circuit block diagrams shown in FIGS. 1 and 3 to 5, electric power lines for supplying electric power to drive a motor are designated by solid lines, whereas control lines such as signal lines are designated by dotted lines.

As shown in the figures, a motor driving apparatus 1 includes a power source rectifier circuit 13 for converting AC electric power supplied from a three-phase AC power source into DC electric power, and an inverter circuit 10 for converting this DC electric power into AC electric power of variable voltage and variable frequency to be supplied to the motor 2, wherein the power source rectifier circuit 13 is connected with the inverter circuit 10 via a DC link.

The power source rectifier circuit 13 may be constituted, for example, by a three-phase diode bridge circuit that performs full-wave rectification of the three-phase AC electric power.

On the other hand, the inverter circuit 10 may be formed, for example, by a bridge circuit including power devices (for example, transistors) and diodes connected in parallel with the power devices. Then, an inverter driving part 31, which is, for example, a transistor PWM control circuit, controls ON/OFF operations of these power devices, so that DC electric power can be converted into AC electric power of desired voltage and frequency and, then, supplied to the motor 2 to control its speed.

A capacitor C1 is connected to the DC link between the power source rectifier circuit 13 and the inverter circuit 10 and the capacitor C functions to supply excessive driving current during normal power operation of the motor or smooth the output of the power source rectifier circuit 13, as well as to store regenerative electric power occurring due to the induced electromotive force produced in the motor 2 when the motor 2 is decelerated or caused to stop so that the regenerative energy (deceleration energy) can be reused.

The motor driving apparatus 1 includes a controller 30 such as a numerical controller for sending commands to the inverter circuit 10 to control the speed of the motor 2. The inverter driving part 31 performs the ON/OFF operations of the power devices based on the commands from the controller 30 and supplies the electric power to drive the motor 2.

Further, the motor driving apparatus 1 includes a step-up type DC/DC converter circuit 11 that boosts the voltage (the DC link voltage) appearing at an output of the capacitor C1 according to the regeneration command, which is output from the controller 30 to feed the energy stored in the capacitor C1, for example, when maintenance work, on the motor driving apparatus 1, is performed.

The step-up type DC/DC converter circuit 11 boosts the voltage appearing at the output of the capacitor C1 to a voltage that is, for example, higher than the output voltage of the power source rectifier circuit 13.

The output power of the step-up type DC/DC converter circuit 11 is converted into AC electric power by an AC inverter circuit 12 (a DC/AC conversion circuit) and fed to the three-phase AC power source via a reactor 23.

As illustrated in FIG. 1, the AC inverter circuit 12 may be constituted by a bridge circuit including power devices (such as transistors, for example) and diodes connected in antiparallel with these power devices. Further, the AC inverter circuit 12 includes an inverter driving part 33 that performs ON/OFF operations of the power devices and, when the inverter driving part 33 receives the regeneration command mentioned above from the controller 30, it drives the power devices to convert the output power of the step-up type DC/DC converter circuit 11 into AC electric power.

Next, operations of the motor driving apparatus according to the present invention will be described with reference to FIG. 1.

In order to perform maintenance work on the capacitor C1, when an operator puts the motor driving apparatus 1 into maintenance mode through a console (not shown), the controller 30 outputs an open command signal for an electromagnetic connector (MC) 21 for connecting/disconnecting AC main input. Then, after receiving this signal, the MC 21 disconnects the power source rectifier circuit 13 from the three-phase AC power source.

Then, the controller 30 outputs a regeneration command signal to a control part 32 in the step-up type DC/DC converter circuit 11. After receiving this regeneration command signal, the step-up type DC/DC converter circuit 11 boosts the DC link voltage (that is, the voltage at the output terminal of the capacitor C1) input to its input terminals I1 and I2 and outputs it at its output terminals O1 and O2.

Here, the boosted voltage appearing at the output terminals O1 and O2 should be set to a value higher than that of the three-phase AC power source rectified by the power source rectifier circuit 13. For example, the step-up type DC/DC converter is preferably set so as to boost the input voltage (the voltage between I1 and I2) to a value substantially equal to that of the DC link voltage appearing in the commonly used servomotor driving apparatus having a power source rectifier circuit that can perform regeneration, an inverter circuit, and a DC link that interconnects them when the regenerative energy is fed to the electric power source at the time of deceleration of the motor m, and to output the voltage to the output terminals O1 and O2 stably.

At the same time, the controller 30 also outputs the regeneration command signal to the inverter driving part 33 in the AC inverter circuit 12 (the DC/AC conversion circuit) and outputs a connection command signal to an electromagnetic connector (MC) 22 for connecting/disconnecting AC input to the regeneration inverter. After receiving the regeneration command signal, the AC inverter driving part 33 drives the power devices in the AC inverter circuit 12 in synchronization with the phase of the three-phase AC power source to convert the DC electric power boosted by the step-up type DC/DC converter circuit 11 into AC electric power and output the AC electric power, which is, in turn, fed to the three-phase AC power source via the MC 22.

Figure 2:
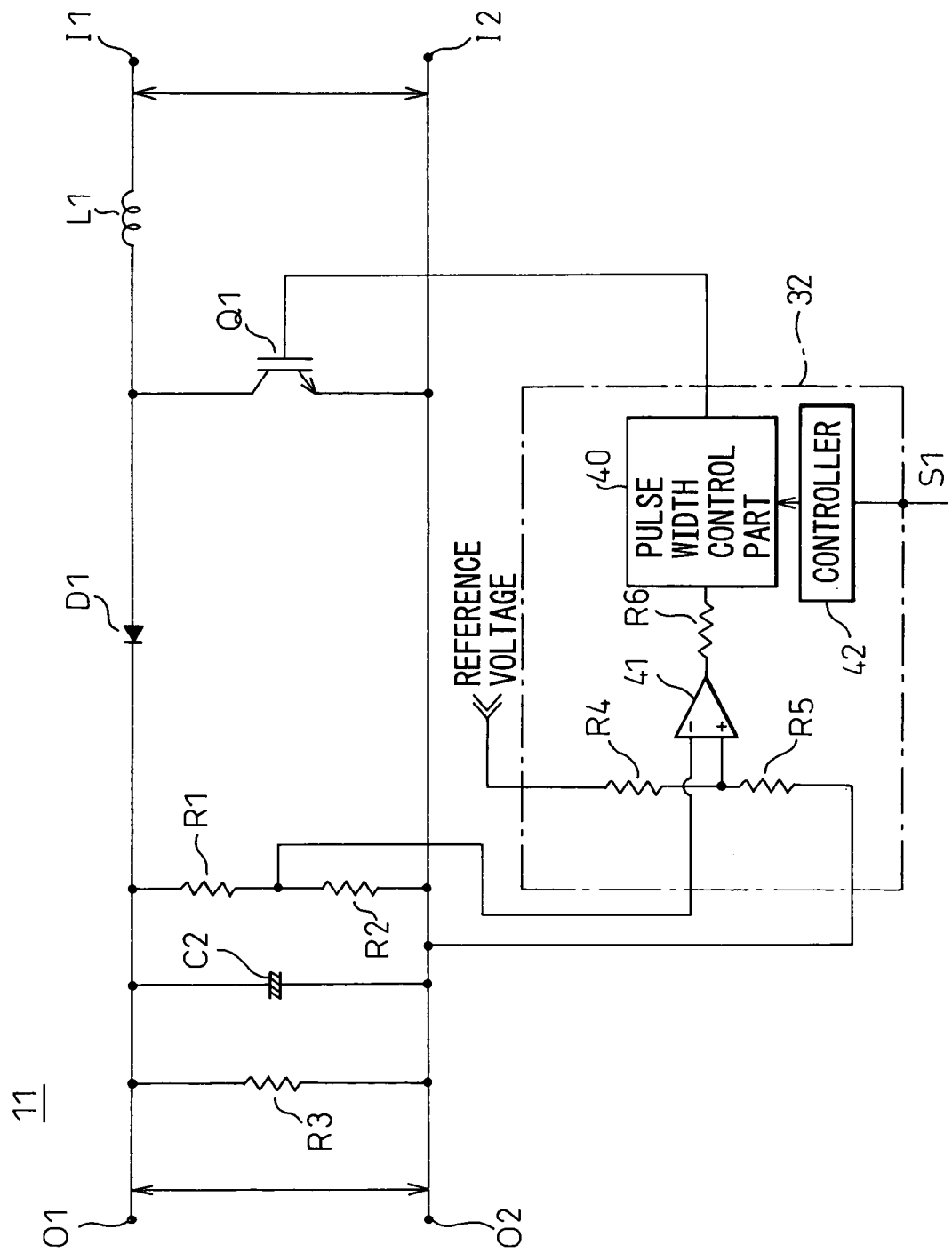
FIG. 2 is a block diagram of a step-up type DC/DC converter circuit in the motor driving apparatus shown in FIG. 1.

FIG. 2 is a block diagram of the step-up type DC/DC converter circuit 11 in the motor driving apparatus 1 shown in FIG. 1.

The step-up type DC/DC converter circuit 11 includes a reactor L1, a diode D1, a switching device Q1, resistors R1 and R2, a capacitor C2, a resistor R3 for discharging the capacitor C2, and a control part 32. Further, the control part 32 includes a pulse width control part 40, a differential amplifier 41, resistors R4, R5 and R6, and a controller 42 that receives a regeneration command from the controller 30 and operates the pulse width control part 40.

The reactor L1, the diode D1, the switching device Q1, the pulse width control part 40, the differential amplifier 41, and the resistors R1, R2, R4, R5 and R6 constitute a boost switching regulator circuit that amplifies, by means of the differential amplifier 41, the difference between the charging voltage of the capacitor C2 divided by the resistors R1 and R2 and a predetermined reference voltage divided by the resistors R4 and R5 and outputs it to the pulse width control part 40.

When the controller 42 receives the regeneration command from the controller 30, the controller 42 outputs a signal to allow the pulse width control part 40 to operate. When the pulse width control part 40 is allowed to operate, by the signal from the controller 42, the pulse width control part 40 outputs a signal having a controlled pulse width to control ON/OFF operations of the switching device Q1. When the switching device Q1 is turned ON, energy is stored in the reactor L1 and, when the switching device Q1 is turned OFF, the energy is discharged to charge the capacitor C2. Here, the charging voltage of the capacitor C2 is controlled to be constant by a feedback circuit of the resistors R1, R2 and R6, the differential amplifier 41, and the pulse width control part 40.

Assuming that the input voltage (the voltage between I1 and I2) of the step-up type DC/DC converter circuit 11 or, in other words, the DC link voltage is Vi, the ON time of the switching device Q1 is Ton, and its OFF time is Toff, the output voltage (the voltage between O1 and O2) of the step-up type DC/DC converter circuit 11 or, in other words, the charging voltage Vo of the capacitor C2 can be expressed by the following formula 1:

$$Vo = Vi \times (Ton + Toff) / Toff \quad (1)$$

For example, when Ton=5 μs and Toff=15 μs, the output voltage Vo is boosted to a value 1.3 times higher than the input voltage Vi. Thus, the capacitor C2 is charged by a voltage higher than the DC link voltage so that the output voltage of the step-up type DC/DC converter circuit 11 can be boosted.

When the charging voltage of the capacitor C2 is increased, the voltage divided by the resistors R1 and R2 is also increased and the output voltage of the differential amplifier 41 is reduced. As a result, the ON time Ton output from the pulse width control part 40 becomes shorter and the increasing speed of the charging voltage is reduced. In contrast, when the charging voltage of the capacitor C2 is reduced, the output voltage of the differential amplifier 41 is increased, the ON time Ton output from the pulse width control part 40 becomes longer and the reducing speed of the charging voltage is reduced. Therefore, the output voltage of the step-up type DC/DC converter circuit 11 is eventually kept at a predetermined value.

Figure 3:
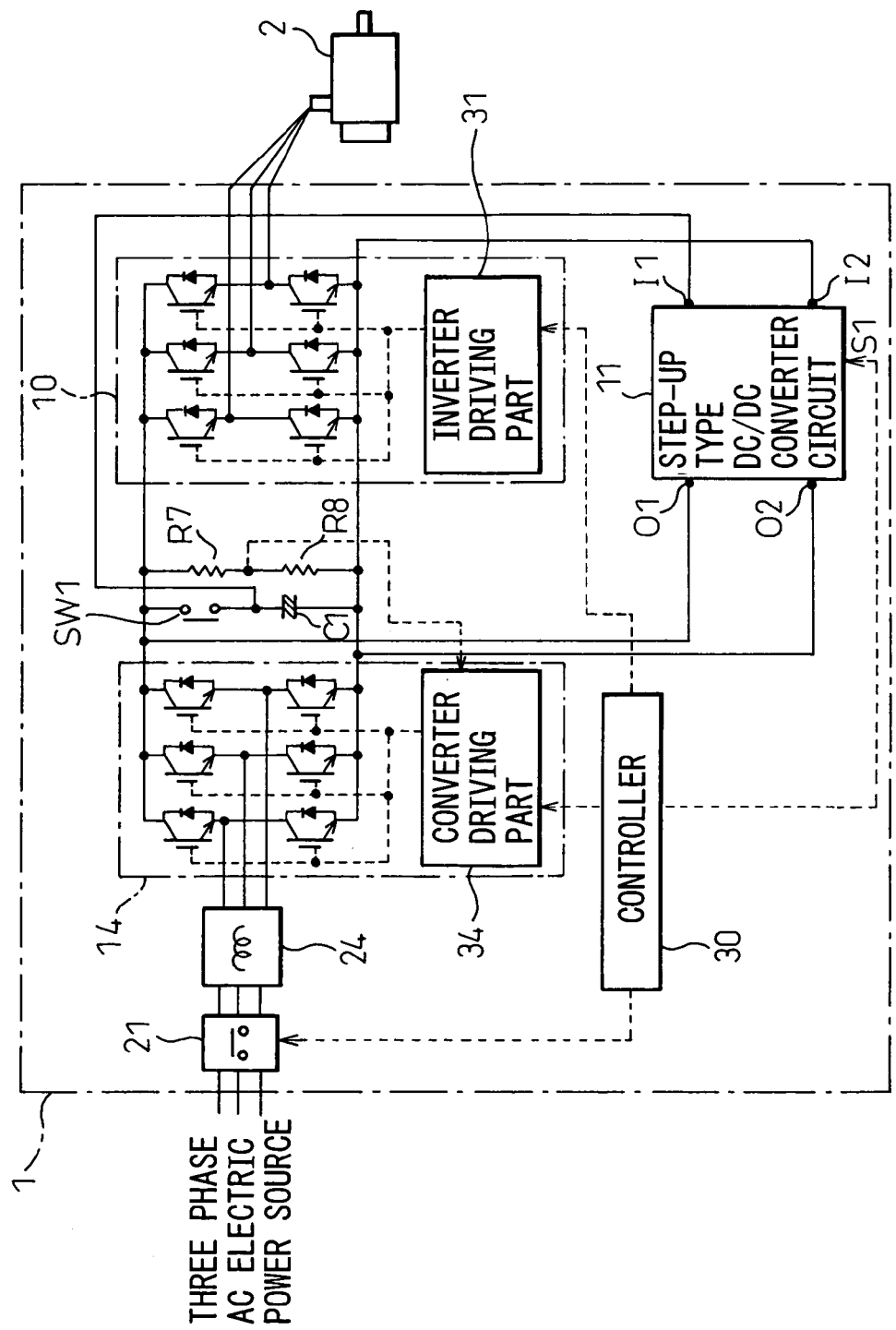
FIG. 3 is a block diagram of a motor driving apparatus according to a second embodiment of the present invention.

FIG. 3 is a block diagram of a motor driving apparatus according to a second embodiment of the present invention. The exemplary motor driving apparatus 1 shown in FIG. 3 includes a converter circuit 14 that acts as a power source rectifier circuit to perform regeneration. Then, the DC link is provided between the converter circuit 14 and the inverter circuit 10 to transfer the DC electric power, rectified from the three-phase AC electric power by the converter circuit 14, to the inverter circuit 10.

The converter circuit 14 is constituted by a bridge circuit including power devices (such as transistors, for example) and diodes connected in anti-parallel with these power devices. Then, during normal power operation of the motor 2, the diodes perform full-wave rectification of AC electric power supplied from the three-phase AC power source to convert it into DC electric power.

On the other hand, during regeneration of the motor 2, when the link voltage divided by the resistors R7 and R8 exceeds a predetermined voltage value, the converter driving part 34 drives the power devices in synchronization with the phase of the three-phase AC power source to feed the regenerative electric power to the electric power source. Further, also when the converter driving part 34 receives the regeneration command output by the controller 30, the converter driving part 34 drives the power devices in synchronization with the three-phase AC power source to feed the energy stored in the capacitor C1 to the electric power source via the step-up type DC/DC converter circuit 11.

Similarly to the motor driving apparatus shown in FIG. 1, the motor driving apparatus 1 shown in FIG. 3 also includes the step-up type DC/DC converter circuit 11. Here, the input terminals 11 and 12 of the step-up type DC/DC converter circuit 11 are connected to the output terminals of the capacitor C1 while the output terminals O1 and O2 of the step-up type DC/DC converter circuit 11 are connected to the DC link. Further, the motor driving apparatus 1 includes a switch SW1 that disconnects the capacitor C1 from the DC link to prevent formation of a positive feedback loop by the step-up type DC/DC converter circuit 11 when the step-up type DC/DC converter circuit 11 operates.

When the controller 30 outputs the regeneration command, the switch SW1 first disconnects the capacitor C1 from the DC link and, then, after receiving the regeneration command, the step-up type DC/DC converter circuit 11 boosts the charging voltage of the capacitor C1 that is the input voltage (the voltage between I1 and I2) to a value higher than that of the three-phase AC electric power rectified by the converter circuit 14 and outputs the voltage to the output terminals O1 and O2. For example, the step-up type DC/DC converter circuit 11 may boost the input voltage (the voltage between I1 and I2) to a value substantially equal to that of the DC link voltage when the converter 14 feeds the regeneration energy to the electric power source during deceleration of the motor and output the voltage to the output terminals O1 and O2 stably.

Then, after receiving the regeneration command output by the controller 30, the converter driving part 34 drives the power devices in synchronization with the phase of the three-phase AC power source to feed to the electric power source the charging energy of the capacitor C1 that is boosted by the step-up type DC/DC converter circuit 11 and output to the DC link.

Figure 4:
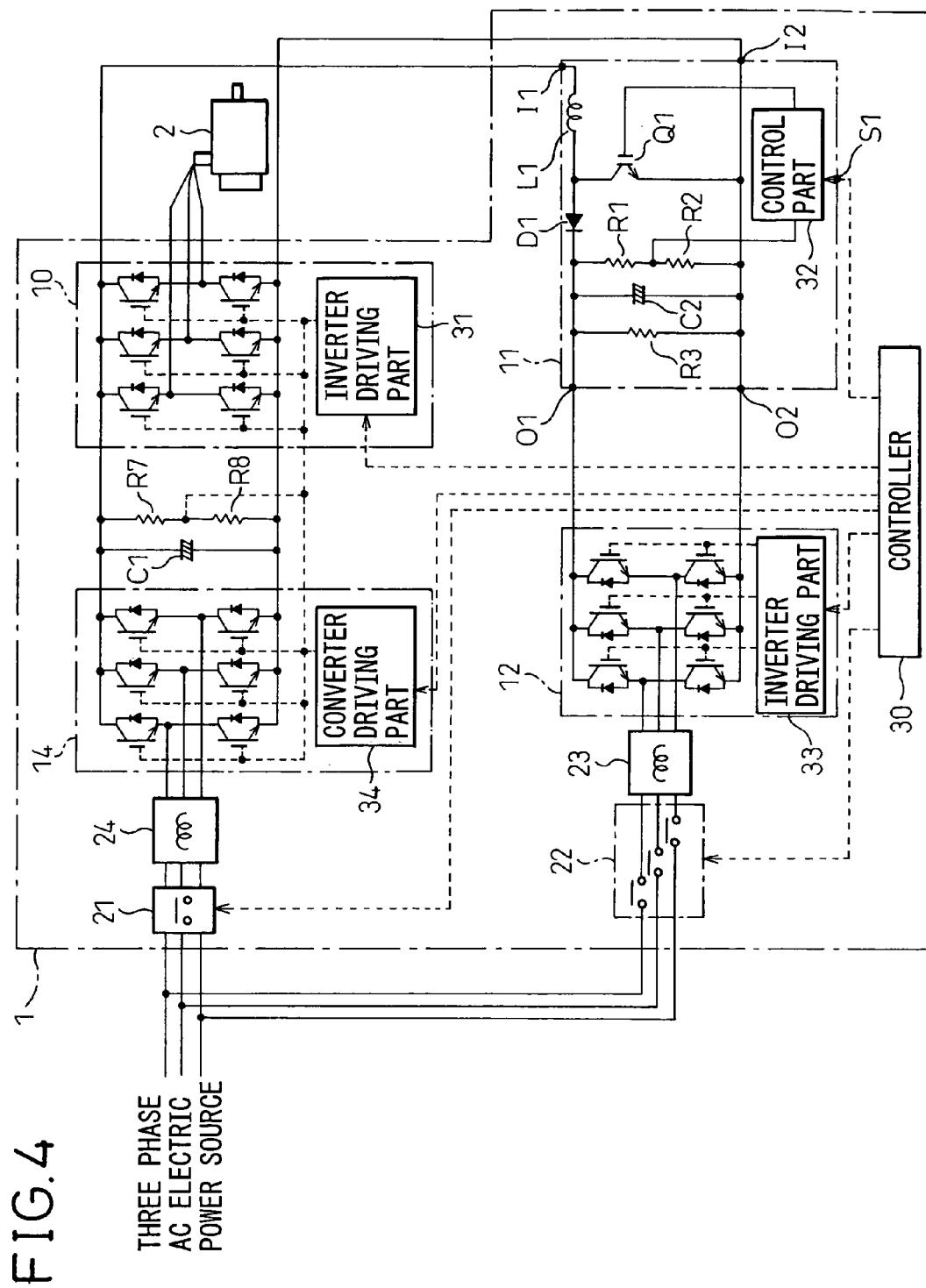
FIG. 4 is a block diagram of a motor driving apparatus according to a third embodiment of the present invention.

FIG. 4 is a block diagram of a motor driving apparatus according to a third embodiment of the present invention. As shown in FIG. 4, the motor driving apparatus 1 includes the converter circuit 14 shown in FIG. 3 that is configured to perform regeneration, the inverter circuit 10 that converts DC electric power into AC electric power and supplies it to the motor 2, and the DC link that connects the converter circuit 14 with the inverter circuit 10 and, similarly to that shown in FIG. 1, the motor driving apparatus 1 is provided with the step-up type DC/DC converter circuit 11, the AC inverter circuit 12, the electromagnetic connector 21 for connecting/disconnecting AC main input, and the electromagnetic connector 22 for connecting/disconnecting AC input to the regeneration inverter.

The step-up type DC/DC converter circuit 11, the input terminals of which are connected to the DC link, boosts the DC link voltage as described above and outputs it to the AC inverter circuit 12. Then, the AC inverter circuit 12 converts it into three-phase AC electric power and feeds it to the electric power source. Features of each element are similar to those described above with reference to FIGS. 1–3, and a description is omitted here.

Figure 5:
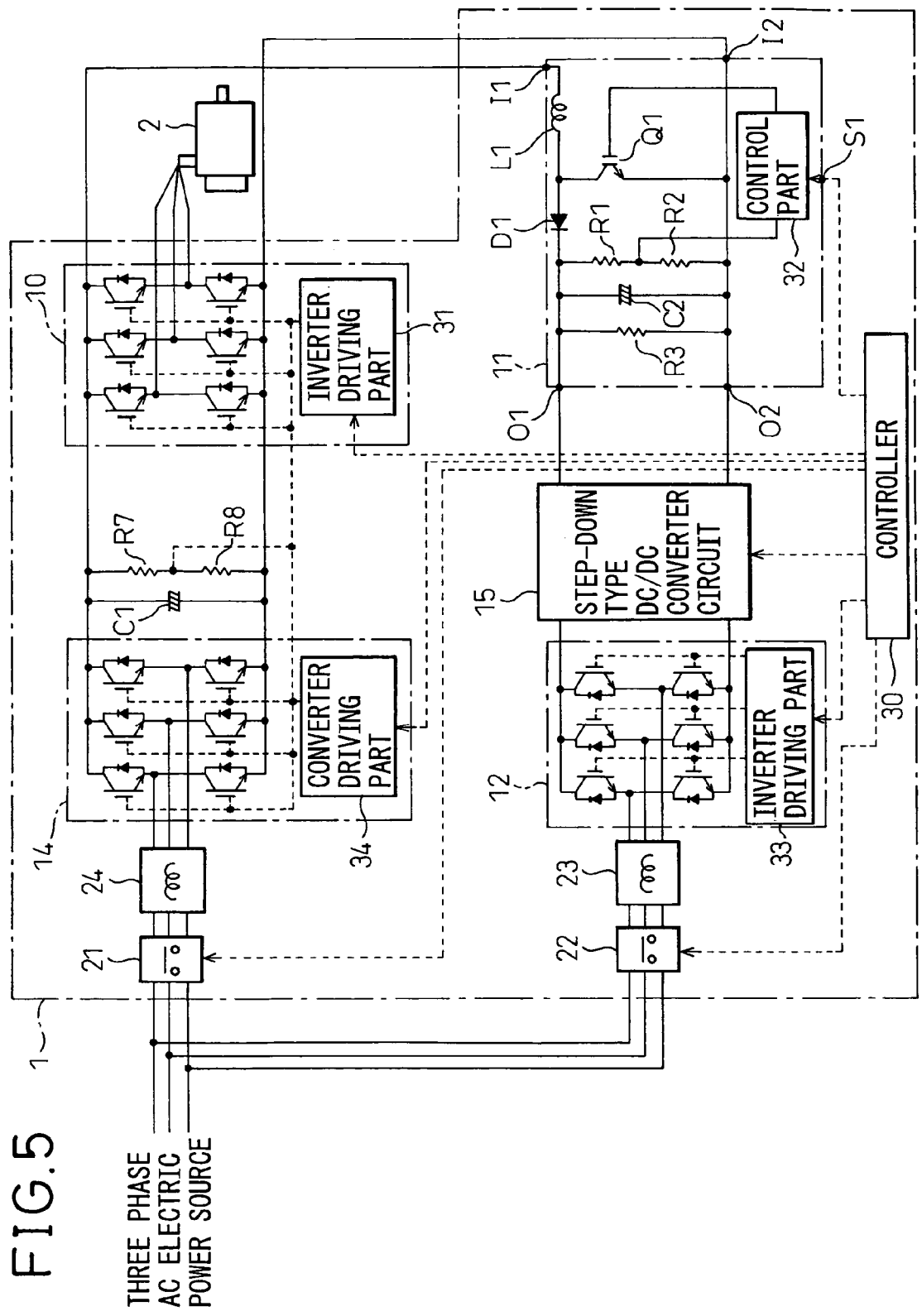
FIG. 5 is a block diagram of a motor driving apparatus according to a fourth embodiment of the present invention.

FIG. 5 is a block diagram of a motor driving apparatus according to a fourth embodiment of the present invention. The exemplary motor driving apparatus 1 shown in FIG. 5 illustrates a configuration that adopts a step-up type PWM rectification converter for the converter circuit 14 shown in FIG. 4. In this configuration, where the DC link voltage is very high such as, for example, 700–800 V, in order to input the DC link voltage to the AC inverter circuit 12 directly, the power devices of the AC inverter circuit 12 may have to be resistant to such high voltage and, as a result, the AC inverter circuit 12 cannot be constructed inexpensively.

Therefore, the motor driving apparatus 1 shown in FIG. 5 is provided with a step-down type DC/DC converter circuit 15 between the step-up type DC/DC converter circuit 11 and the AC inverter circuit 12 of the motor driving apparatus 1 shown in FIG. 4.

In order to perform maintenance work of the capacitor C1, when an operator puts the motor driving apparatus 1 into maintenance mode through a console (not shown), the controller 30 outputs an open command signal for the MC 21 to disconnect the converter circuit 14 from the three-phase AC power source. Then, the controller 30 initially does not operate the step-up type DC/DC converter circuit 11 but operates the step-down type DC/DC converter circuit 15 to reduce the DC link voltage to a level somewhat higher than that of the three-phase AC electric power rectified by the converter circuit 14 (for example, a level substantially equal to the DC link voltage when the converter circuit 14 feeds the regenerative energy to the electric power source during deceleration of the motor) and to output the reduced DC link voltage to the AC inverter circuit 12.

Then, when the energy stored in the capacitor C1 is reduced and the DC link voltage reaches a predetermined voltage value (for example, a lower limit voltage value at which the step-down type DC/DC converter circuit 15 can operate), the controller 30 operates the step-up type DC/DC converter circuit 11 along with the step-down type DC/DC converter circuit 15.

According to the present invention, the output voltage of the power storage part, which is connected with the DC link and which stores the electrostatic energy, is boosted and fed to the electric power source and, therefore, the electrostatic energy can be fed to the electric power source till the output voltage of the power storage part is reduced to a desired voltage value (till the energy stored in the power storage part is reduced to a desired energy amount). It can improve safety of the operators in maintenance work on the motor driving apparatus as described above.

Further, the electric power energy that was wastefully discharged by resistors and the like hitherto can be fed to the electric power source and, therefore, energy saving can be implemented.

The present invention is applicable to a converter apparatus that converts AC power supplied from a power source into DC power and supplies the DC power to an inverter to drive a motor, and an inverter apparatus that drives a motor by being supplied with power from such a converter apparatus.

While the present invention has been described with reference to the preferred embodiments selected only for illustrative purposes, it will be apparent, to those skilled in the art, that various modifications, omissions, and departures can be made to these embodiments without departing from the spirit and scope of the present invention. Further, it is to be understood that the terms used in the appended claims are not limited to the specific meanings used in the embodiments described in this specification.

What is claimed is:

1. A motor driving apparatus comprising: an inverter circuit for driving a motor; a power source rectifier circuit for rectifying AC electric power to DC electric power; a DC link for connecting said inverter circuit with said power source rectifier circuit; and a power storage part that is connected with said DC link and that stores electrostatic energy by means of DC link voltage generated in said DC link, wherein the voltage appearing at an output of said power storage part due to said stored electrostatic energy is boosted, and the electric power having the boosted voltage is converted into AC electric power and fed to said AC electric power source.

2. A motor driving apparatus according to claim 1, further comprising a step-up type DC/DC converter circuit for boosting the voltage appearing at the output of said power storage part due to said electrostatic energy stored in said power storage part.

3. A motor driving apparatus according to claim 2, further comprising a DC/AC conversion circuit for converting the DC electric power boosted by said step-up type DC/DC converter circuit into AC electric power.

4. A motor driving apparatus according to claim 2, further comprising a switch for disconnecting said power storage part from said DC link when said step-up type DC/DC converter circuit boosts the voltage appearing at the output of said power storage part, wherein said power source rectifier circuit is configured so that it can perform regeneration and converts the DC electric power boosted by said step-up type DC/DC converter circuit into AC electric power and feeds it to said AC electric power source.

* * * * *